United States Patent Office 3,187,543
Patented June 8, 1965

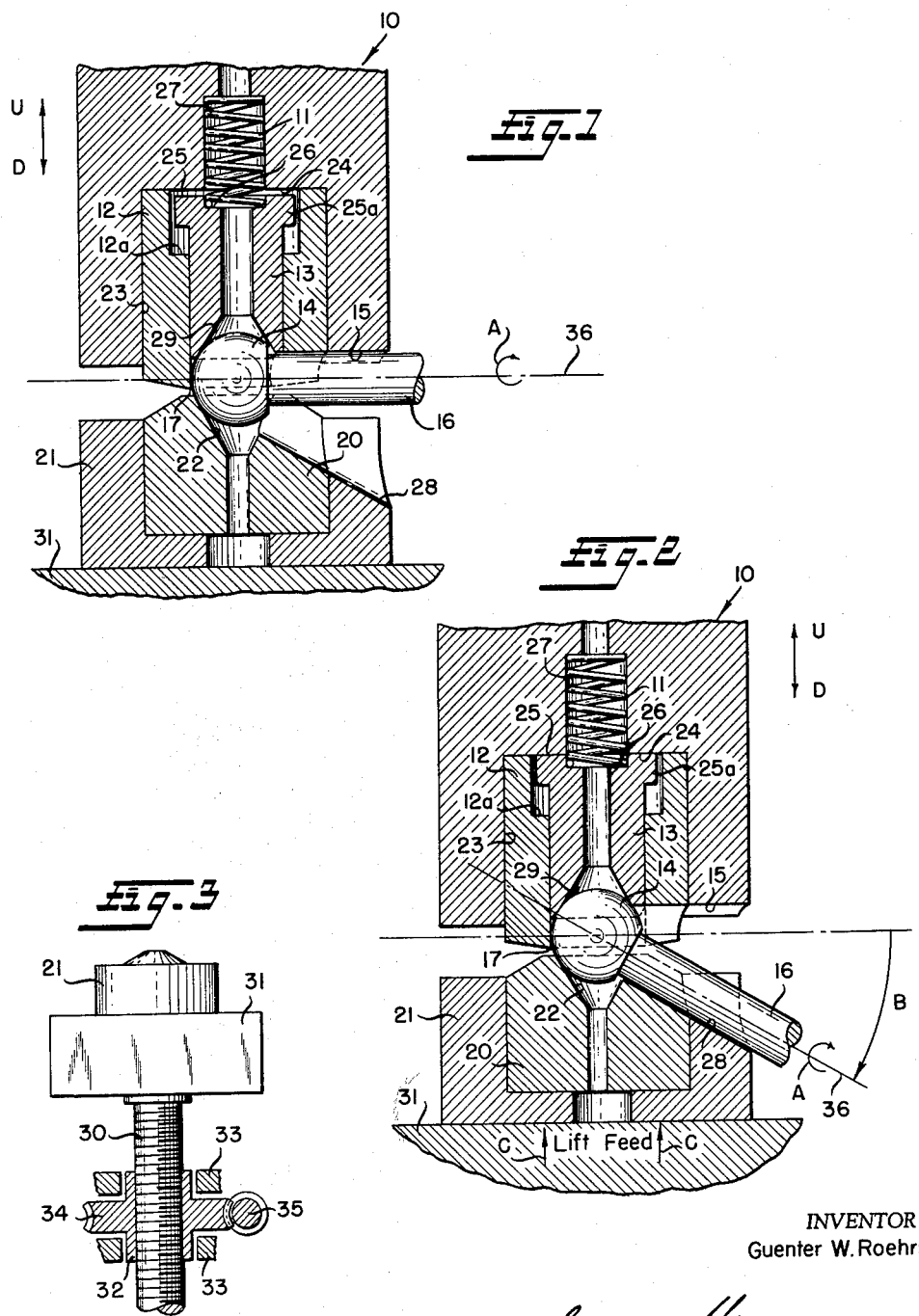

3,187,543
METHOD AND APPARATUS FOR MANUFACTURING SPHERICAL PARTS SUCH AS BALL STUDS
Guenter W. Roehrs, Detroit, Mich., assignor to General Motors Corporation, Detroit, Mich., a corporation of Delaware
Filed Sept. 19, 1961, Ser. No. 139,189
19 Claims. (Cl. 72—324)

The present invention relates generally to a method and apparatus for manufacturing spherical parts. More particularly, the invention is concerned with a method and apparatus for machining and surface finishing products having spherical sections such as ball studs, especially solid ball studs.

Precise machining and surface finishing of solid ball studs offer great difficulties, and expensive special machines causing high production costs are required.

The principal object of this invention is to provide a simple and economical method and apparatus for producing precise spherical surfaces on spheres, such as the ball head of ball studs.

Another object is to provide two distinct manufacturing phases including, first, removing of excess material by machining the spherical part to a specified dimension and, second, finishing the machined spherical surface by a non-chip producing, sphere forming and cold hardening process.

Another object is to generate a precise sphere by integration of a multiplicity of cylindrical surface elements produced by a special cutting tool.

Still another object is to produce a finish on the sphere by integration of a multiplicity of local surface impressions produced by a special impact tool.

Another object is to provide surface impressions of annular shape. Another object is to provide a combination tool including a cutting tool and an impact tool.

Another object is to provide an impact tool providing annular shaped impressions on the sphere.

The method of precision machining and finishing the spherical surface of parts, such as ball studs, includes broadly the steps of removing excess material by shaving the spherical surface to a specified dimension and thereafter subjecting the spherical surface to a multiplicity of tool impacts, causing a multiplicity of impressions for finishing and cold hardening the spherical surface.

It is proposed to provide an apparatus comprising a linearly oscillating tool holder having a cavity with an end wall, a cutting tool having a circular cutting edge inserted in said cavity in abutting relation with said end wall and protruding from said tool holder. Furthermore, an impact tool which is slidably coaxially disposed in said cutting tool is provided, said impact tool having an end face opposite said cavity end wall and a circular working surface for impressing the spherical surface. The impact tool is inactive during cutting operation with said cutting tool by virtue of clearance between its end face and said cavity end wall. Spring means are interposed between tool holder and impact tool for seating the impact tool on the ball head during cutting operation. Furthermore, a support for the ball head opposite the tool holder is provided and means for bringing the end face of the impact tool in abutting relation with said cavity end wall after termination of the cutting operation, thus rendering the impact tool effective.

The drawing illustrates the invention by way of example.

FIG. 1 is a sectional view of the apparatus according to the invention and shows the cutting tool in operation.

FIG. 2 is a sectional view of the apparatus and shows the impact tool in operation.

FIG. 3 shows a device for moving the work support relative to the tool holder.

The apparatus may be made to suit a punch press, a swaging machine, or some other adequate equipment with oscillating tool motion.

The production method according to the invention involves two distinct manufacturing phases:
(1) Removing of excess material by trimming or shaving the spherical part to a specified dimension;
(2) Finishing the trimmed spherical surface by a non-chip producting, sphere form finishing and surface cold hardening process.

The arrangement for the first phase of the new manufacturing method is shown in FIG. 1 for solid ball studs. Shank 16 of the stud is held in the shown horizontal position by an adapter (not shown) which rotates the stud at least 180°, or more, around its axis 36 as indicated by arrow A. The rotation is gradually in accordance with the linear oscillation of the tool holder 10. The ball head 14 of the stud is resting on a support 21, for instance, on the truncated cone surface of cavity 22 of an insert 20. In this manner, the ball head is properly located with respect to the tool holder and tools. The spherical shape of the ball head is well enough preformed or pre-machined.

Tool holder 10 has a cavity 23 terminating in an end wall 24. A trimming or shaving tool 12 is inserted in cavity 23 abutting end wall 24 and protruding from tool holder 10. The means for securing tool 12 to the tool holder 10 are not shown since they are conventional. Insert 12 has a circular cutting edge 17 which cuts a precise cylindrical surface element on the ball stud head 14 when oscillating straight up and down, as indicated by the arrows U and D. Shavings and chips produced by this cutting process are floated away by an oil stream as is conventional in other cutting processes. After each cut at the end of the downstroke of the tool holder and insert, the stud shank 16 is rotated a small amount when cleared by the tool at the end of the upstroke. Rotation may be achieved by a suitable mechanism (not shown) between stud adapter and oscillating tool holder 10 which is effective in the horizontal and in the inclined position of the shank.

The next tool oscillation cycle produces a new precise cylindrical surface element and so do all subsequent cycles, until after many oscillations and a stud rotation of at least 180° a very precise spherical surface has been generated by integration of the cylindrical surface elements produced by the action of circular cutting edge 17. Cutting edge 17 is recited as circular in certain of the appending claims although it is interrupted by a laterally extending slot 15. The slot 15 extends only to one side and includes a cut-out portion at the lower end of tool 12 and tool holder 10. Slot 15 may also include a cut-out portion of the insert 13 to be described later. The purpose of slot 15 is to clear the shank 16 of the stud.

An impact tool shown as another insert 13 is coaxially disposed in insert 12 with a sliding fit and is adapted to slide up and down inside insert 12. There are means (not shown) to prevent rotation of impact tool 13 relative to shaving tool 12. Insert 13 is backed by a coil spring 11. Spring 11 abuts the end face 25, preferably a recess 26 in that surface, and is seated in cavity 27 of the tool holder 10. The insert 13 is flanged at 25a. Flange 25a cooperates with a shouler 12a of cutting tool 12 and prevents insert 13 from dropping out of tool 12. During the cutting phase shown in FIG. 1, impact tool 13 is inactive and holds the ball head 14 in position with the force of the spring 11. Impact tool 13 has no contact of its upper end face 25 with the end wall 24 of the tool holder 10 during the complete oscillation cutting cycle. There is clearance provided between surfaces 24 and 25.

The second phase of the manufacturing process is shown in FIG. 2. After the ball head 14 is spherically cut to size, the stud shank 16 is swung around the center of the sphere by the shank adapter (not shown) into an inclined position, as indicated by arrow B in FIG. 2. The support 21 and insert 20 are provided with an inclined slot 28 to allow the shank 16 to be swung in the inclined position. At the same time, support 21, including insert 20, adapter and stud, are lifted a small amount as indicated by arrows C—C in FIG. 2, until impact tool 13 contacts fully both ball head 14 and end wall 24 of tool holder 10 at the end of the downstroke of the oscillating tool. Cutting edge 17 of shaving tool 12 is free to move over the ball head 14. Lifting could be achieved, for instance, by a screw 30 attached to the work table 31 of the punch press as indicated in FIGURE 3. Screw 30 can be axially moved by nut 32 which is axially immovable but rotatably mounted in bearings 33 of the base of the press (not shown). Nut 32 is provided with an integral worm gear 34 in mesh with worm 35. Rotation of worm 35 rotates nut 32 thus causing axial movement of screw 30, table 31 and workpiece support 21.

Impact tool 13 has at its lower end a cavity 29 which is a surface of revolution, preferably a truncated cone surface. This truncated cone surface constitutes the working surface of impact tool 13. It can be used for different ball diameters. Of course, any other circular working surface could be provided on impact tool 13. In the inclined position of the ball stud the shank axis 36 intersects the circular contact line of the working surface. Local contact impressions produced on the ball head 14 by working surface 29 are of annular shape. The integration of all local surface impressions produced by a multiplicity of pressure contacts of impact tool 13 on ball head 14 after gradual rotation of the stud around the axis of shaft 16 (see arrow A) represents a precise sphere having a dense, high quality surface finish with a cold hardened surface.

In case a small portion of the ball head near the shank is not densified by the impact tool in the inclined stud position shown in FIG. 2 the shank may be raised a certain amount so that said portion can be treated by the impact tool.

It is, of course, possible to employ two separate machines and tool sets for the two phases of the manufacturing process. Instead of lifting the work support 21, it is possible to lower the oscillating tool holder to achieve the same effect with regard to the pressure contact of impact tool 13.

I claim:
1. A method of precision machining and finishing the spherical surface of parts such as ball studs including the steps of removing excess material by shaving the spherical surface to a specified dimension and thereafter subjecting the spherical surface to a multiplicity of tool impacts causing a multiplicity of impressions for finishing and cold hardening said surface.

2. A method for precision machining and finishing the spherical surface of parts such as ball studs including the steps of removing excess material by a multiplicity of successive circular cuts producing precise cylindrical surface elements on the spherical surface, rotating the spherical part gradually between successive cuts and subjecting the spherically cut surface to a multiplicity of impacts from a non-chip producing tool causing a multiplicity of impressions for finishing and cold hardening said surface.

3. A method for precision machining and finishing the spherical surface of parts such as ball studs having a ball head and shank, said method comprising the steps of removing excess material with a circular cutting edge by a plurality of successive circular cuts producing precise cylindrical surface elements on the spherical surface while rotating the part a small amount between successive cuts, thereafter swinging said part around the center of the sphere into an inclined position and treating the spherically cut surface with an impact tool producing a multiplicity of impressions of annular shape while rotating the part about its shank axis between successive impacts for finishing and cold hardening said surface.

4. Apparatus for precision machining and surface finishing of spherical parts such as ball studs having a combination tool comprising means for spherically shaving the sphere and additional impact means for thereafter finishing the sphere by covering it with a plurality of integrated surface impressions.

5. Apparatus for precision machining and surface finishing of spherical parts such as ball studs comprising a shaving tool with circular cutting edge for spherically shaving the sphere by a multiplicity of cuts and an impact tool with circular working surface for thereafter finishing the sphere by covering it with a multiplicity of integrated annular surface impressions.

6. Apparatus for precision machining and surface finishing of spherical parts such as ball studs having a ball head and shank comprising a linearly oscillating tool holder, said tool holder having a cavity with an end wall, a cutting too having a circular cutting edge inserted in said cavity in abutting relation with said end wall and protruding from said tool holder, an impact tool slidably coaxially disposed in said cutting tool, said impact tool having a working surface for impressing the ball head and and end face opposite said cavity end wall, said impact tool being inactive during cutting operation with said cutting tool by virtue of clearance between its end face and said cavity end wall.

7. Apparatus for precision machining and surface finishing of spherical parts such as ball studs having a ball head and shank comprising a linearly oscillating tool holder, said tool holder having a cavity with an end wall, a cutting tool having a circular cutting edge inserted in said cavity in abutting relation with said end wall and protruding from said tool holder, an impact tool slidably coaxially disposed in said cutting tool, said impact tool having a working surface for impressing the ball head and an end face opposite said cavity end wall, said impact tool being inactive during cutting operation with said cutting tool by virtue of clearance between its end face and said cavity end wall, spring means interposed between said tool holder and said impact tool for seating said impact tool on the ball head during cutting operation, and a support for said ball head opposite said tool holder.

8. Apparatus for precision machining and surface finishing of spherical parts such as ball studs having a ball head and shank comprising a linearly oscillating tool holder, said tool holder having a cavity with an end wall, a cutting tool having a circular cutting edge inserted in said cavity in abutting relation with said end wall and protruding from said tool holder, an impact tool slidably coaxially disposed in said cutting tool, said impact tool having a working surface for impressing the ball head and an end face opposite said cavity end wall, said impact tool being inactive during cutting operation with said cutting tool by vrtue of clearance between its end face and said cavity end wall, spring means interposed between said tool holder and said impact tool for seating said impact tool on the ball head during cutting operation, and a support for said ball head opposite said tool holder, and means for bringing the end face of said impact tool in abutting relation with said cavity end wall after termination of the cutting operation thus rendering said impact tool effective.

9. An apparatus as set forth in claim 8 in which said cutting tool, and said tool holder are provided at one side with a laterally extending slot to clear the shank of the ball stud.

10. Apparatus for precision machining and surface finishing of spherical parts such as ball studs having a ball head and shank comprising a linearly oscillating tool holder, said tool holder having a cavity with an end wall, a cutting tool having a circular cutting edge inserted in said cavity in abutting relation with said end wall and protruding from said tool holder, an impact tool slidably coaxially disposed in said cutting tool, said impact tool having a circular working surface for impressing the ball head and an end face opposite said cavity end wall, said impact tool being inactive during cutting operation with said cutting tool by virtue of clearance between its end face and said cavity end wall.

11. Apparatus for precision machining and surface finishing of spherical parts such as ball studs having a ball head and shank comprising a linearly oscillating tool holder, said tool holder having a cavity with an end wall, a cutting tool having a circular cutting edge inserted in said cavity in abutting relation with said end wall and protruding from said tool holder, an impact tool slidably coaxially disposed in said cutting tool, said impact tool having a circular working surface for impressing said ball head and an end face opposite said cavity end wall, said impact tool being inactive during cutting operation with said cutting tool by virtue of clearance between its end face and said cavity end wall, spring means interposed between tool holder and impact tool for seating said impact tool on the ball head during cutting operation, a support for said ball head opposite said tool holder, and means for bringing the end face of said impact tool in abutting relation with said cavity end wall after termination of the cutting operation thus rendering said impact tool effective.

12. An apparatus as set forth in claim 11 in which the cutting tool and the tool holder are provided at one side with a laterally extending slot to provide clearance for the shank of the stud.

13. An apparatus as set forth in claim 8 in which said support is provided at one side with a laterally extending inclined slot.

14. An apparatus as set forth in claim 11 in which said support is provided at one side with a laterally extending inclined slot.

15. Apparatus for precision machining and surface finishing of spherical parts such as ball studs having a ball head and shank comprising a linearly oscillating tool holder, said tool holder having a cavity with an end wall, a cutting tool having a circular cutting edge inserted in said cavity in abutting relation with said end wall and protruding from said tool holder, an impact tool slidably coaxially disposed in said cutting tool, said impact tool having an end face opposite said cavity end wall and an internal truncated cone surface as working surface for impressing said ball head, said impact tool being inactive during cutting operation with said cutting tool by virtue of clearance between its end face and said cavity end wall, spring means interposed between tool holder and impact tool for seating said impact tool on the ball head during cutting operation, a support for said ball head opposite said tool holder, and means for bringing the end face of said impact tool in abutting relation with said cavity end wall after termination of the cutting operation thus rendering said impact tool effective.

16. A method for precision machining the spherical surface of parts such as ball studs including the steps of cutting a precise cylindrical element on said surface by means of a cutting tool, indexing the part slightly with respect to said cutting tool, and repeating said steps of cutting and indexing until a spherical surface is formed by the integration of the individually produced cylindrical surface elements.

17. A method for machining the spherical surface of parts such as ball studs having a ball head and shank, said method comprising the steps of cutting a precise cylindrical element on a diameter of said surface by means of a cutting tool having a circular cutting edge, rotating the part a small amount with respect to said cutting tool around the center of said spherical surface, and repeating said steps of cutting and rotating until a spherical surface is formed by the integration of the successively produced cylindrical surface elements.

18. A method for finishing and cold working the spherical surface of parts such as ball studs including the steps of producing an annular shaped impression on said surface by impact with a non-chip producing tool, indexing the part slightly with respect to said tool, and repeating said steps of producing an annular shaped impression and indexing until the integration of the individually formed annular shaped impressions covers the desired area of the spherical surface.

19. A method for finishing and cold working the spherical surface of parts such as ball studs having a ball head and shank, said method comprising the steps of treating said spherical surface with a non-chip producing impact tool having an internal truncated cone as a working surface so as to form on said spherical surface an annular truncated conical surface element, rotating the part a small amount with respect to said tool around the center of said spherical surface, and repeating said steps of treating the surface and rotating the part until the integration of the successively formed annular truncated conical surface elements covers the desired area of the spherical surface.

References Cited by the Examiner

UNITED STATES PATENTS

| 455,101 | 6/91 | Heydenreich | 90—12 |
|---|---|---|---|
| 1,236,620 | 8/17 | Storment et al. | |
| 1,328,276 | 1/20 | Fuchs | 78—18 |
| 2,338,736 | 1/44 | Peterson et al. | |
| 2,847,751 | 8/59 | Reed | 29—148 |
| 3,142,117 | 7/64 | Dier | 29—566 |

WHITMORE A. WILTZ, *Primary Examiner.*

HYLAND BIZOT, *Examiner.*